United States Patent [19]

Bieganski

[11] 4,366,619
[45] Jan. 4, 1983

[54] CABLE STRIPPER

[76] Inventor: Zdzislaw Bieganski, Timber La., Woburn, Bedfordshire, England

[21] Appl. No.: 229,598

[22] Filed: Dec. 29, 1980

[51] Int. Cl.³ .............................................. H02G 1/12
[52] U.S. Cl. ....................................... 30/90.1; 30/113
[58] Field of Search ................ 30/90.1, 113, 111, 109; 81/9.5 R; 83/924, 620, 640

[56] References Cited

U.S. PATENT DOCUMENTS

| | | | |
|---|---|---|---|
| 893,132 | 7/1908 | Bork | 81/9.5 R |
| 2,435,660 | 2/1948 | Tileston | 83/924 |
| 2,738,479 | 3/1956 | Gibson | 339/273 R |
| 2,995,052 | 9/1961 | Funcik | 30/90.1 |
| 3,614,905 | 10/1971 | Bieganski | 81/9.5 R |
| 3,710,654 | 1/1973 | Halverson et al. | 81/9.5 R |

FOREIGN PATENT DOCUMENTS

| | | | |
|---|---|---|---|
| 2523148 | 12/1976 | Fed. Rep. of Germany | 81/9.5 R |
| 611822 | 11/1948 | United Kingdom | 30/90.1 |
| 1102808 | 2/1968 | United Kingdom | 30/90.1 |

Primary Examiner—Roscoe V. Parker
Attorney, Agent, or Firm—C. O. Marshall, Jr.

[57] ABSTRACT

A hand operated tool is described having three blades (40) which can be individually set and which are all manually retractable. After retraction the cable (22) is located in an aperture (16, 18, 20) adjacent a selected one of the blades, and the blades are all spring returned. The device is rotated about the cable to make the cut, and then moved axially to strip the severed portion. FIG. 3 shows the device with part of the housing (10) or body removed to enable the working to be seen.

4 Claims, 3 Drawing Figures

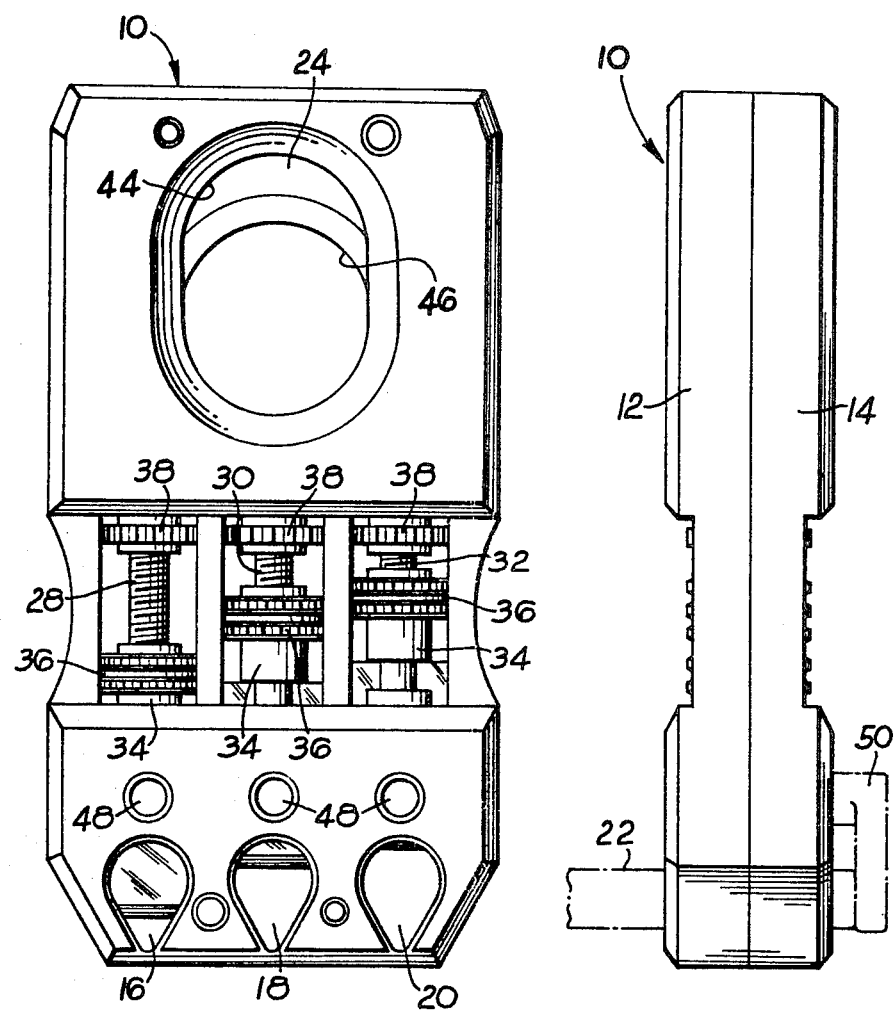

CABLE STRIPPER

DESCRIPTION

This invention relates to a wire stripper, i.e. a tool for use in stripping the sheathing from an electrical conductor by making a peripheral slit in the sheathing and moving the tool axially relative to the conductor so as to sever and remove a portion of the sheathing.

To avoid damage to the sheathed elements of the cable during stripping, it is important to cut or slit the sheathing to the correct depth. Various forms of stripper are available which enable the depth of the cut or slit to be adjusted so that the desired depth of cut is obtained automatically and this simplifies the task of stripping a large number of cables all of the same size. However, where a range of cable sizes have to be stripped or where the cable is of the coaxial type, conventional wire strippers are unsatisfactory because repeated adjustments have to be made to the depth of cut. For example, in the case of coaxial cable, it is necessary to strip the outer sheathing, which is usually of plastics, trim the outer mesh-like conductor and strip the sleeve enclosing the inner conductor. Moreover, the lengths of sheathing, outer conductor and sleeve to be removed differ.

Thus, for example, stripping of coaxial cables gives rise to problems not only in ensuring the correct depths of cut but also in removing the correct lengths of the respective elements in order to facilitate electrical assembly work.

The object of the present invention is to provide a relatively inexpensive tool for stripping cables, especially coaxial cables, which overcomes the aforementioned problems in a simple manner.

According to the present invention there is provided a tool for stripping cables comprising a body formed with at least one aperture through which a cable can be inserted, a blade carrier mounted on the body for movement transversely of said aperture(s) to enable the blade(s) carried thereby to engage and slit the cable and means for limiting travel of the carrier in the cable slitting direction, the blade(s) being mounted adjustably on the carrier to allow variation of the extent to which the blade(s) can encroach upon said aperture(s).

In a preferred embodiment of the invention, the tool is provided with three such apertures and the blade carrier is equipped with three blades co-operable one with each aperture. This form of tool is particularly suitable for stripping of coaxial cables. The blades are adjustable independently of each other so that the three blades can be set to different depths of cut corresponding to the depths of cut required for slitting of the outer sheath, trimming of the outer mesh-like conductor and slitting of the inner sleeve.

Preferably the tool is provided with a stop element associated one with each aperture to limit the extent to which the cable can be inserted. The stop elements may be adjustable axially of the respective aperture or alternatively the stop elements may be releasably connectible to the tool body and the tool may be associated with a set of different sized elements so that the size of element can be selected according to the length of sheath etc. to be removed.

The carrier is conveniently spring-loaded for movement in the cable slitting direction and is adapted to be manually withdrawn from its limiting position to allow cable insertion into said apertures.

In the presently preferred embodiment, the tool body is in the form of a housing in which the carrier is slidably mounted and the housing and carrier are formed with holes to enable the user to withdraw the carrier from its limiting position by inserting his finger through the holes and retracting the carrier. The holes in the housing may for example be pyriforme with their major axes extending in the direction of movement of the carrier and the hole in the carrier may be cicular.

One example of the invention will now be described with reference to the embodiment shown in the accompanying drawings, in which:

FIG. 1 is a front view of a tool for stripping co-axial cables;

FIG. 2 is a side view of the tool; and

Figure 3:
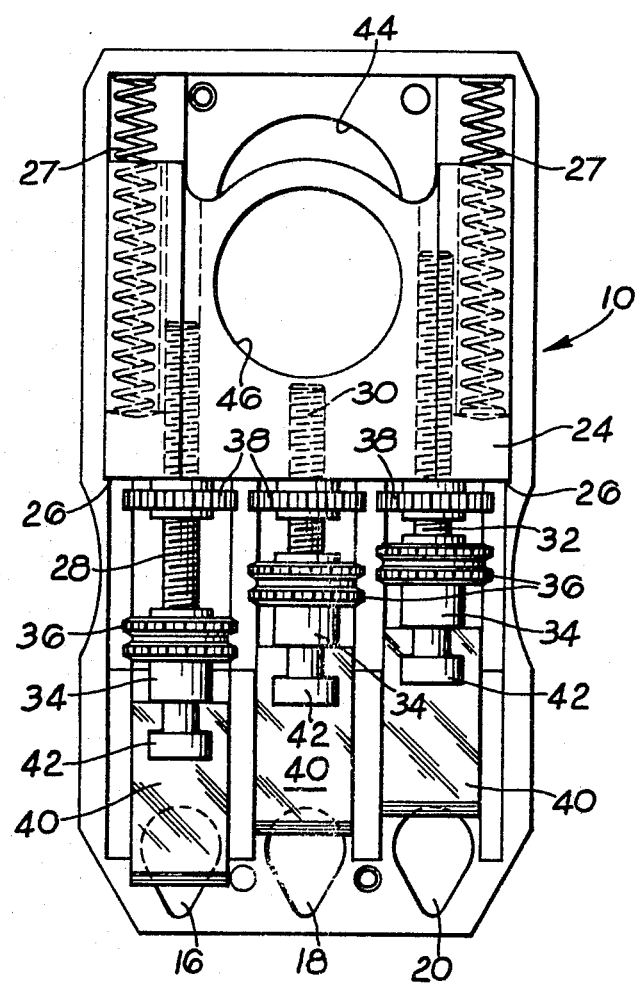
FIG. 3 is a view similar to FIG. 1 but with part of the tool housing removed to show the internal construction of the tool more clearly.

Referring now to the drawings, the tool comprises a housing 10 consisting of two tray-like halves 12, 14. Adjacent one end, each housing portion 12, 14 is formed with three apertures 16, 18 and 20 aligned one with each of the corresponding apertures in the other housing portion so that a cable 22 can be inserted through any one pair of registering apertures in the manner indicated in FIG. 2. The apertures 16, 18 and 20 are of a tapering configuration for reasons that will become apparent subsequently and, in the embodiment illustrated, each aperture comprises a semi-circular portion and a V-shaped portion, the apices of the V's being located closest to the adjacent end of the housing. The margins of the apertures 16, 18 and 20 may be formed with flanges which project inwardly of the housing so as to provide extended support for the cable.

A blade carrier 24 is mounted within the housing 10 for sliding movement lengthwise of the housing towards and away from the apertures 16, 18 and 20. The blade-carrier is limited in its movement towards the apertures 16, 18 and 20 by suitable stop means, for example internal shoulders 26 within the housing, and is biassed towards this limiting position by springs 27. The carrier 24 is formed with a number of internally threaded bores which receive respective screw-threaded rods 28, 30 and 32. The rods 28, 30 and 32 extend lengthwise of the housing towards respective ones of the apertures 16, 18 and 20 and terminate in portions 34 which are internal with the rods 28, 30 and 32 and are provided with knurled sections 36 by means of which the rods 28, 30 and 32 can be adjusted relative to the carrier 24 in the lengthwise direction. Lock nuts 38 are also provided for securing the rods in a selected position of adjustment, the lock nuts 38 also including knurled sections to aid manipulation thereof. In the area of the lock nuts 38 and the knurled sections 36 of portions 34, the housing portions 12, 14 are cut away to allow the user access to these components for the purposes of adjustment.

The portions 34 are each connected to a respective blade 40 which are guided for sliding movement within the housing and are formed with generally T-shaped slots for reception of the heads 42 on portions 34. Thus, when the rods 28, 30 and 32 are adjusted in the lengthwise direction, the blades 40 undergo corresponding adjustments and it will be understood from FIG. 3 that the extent to which the blades 40 encroach upon the apertures 16, 18 and 20 can be varied by appropriate adjustment of the rods 28, 30 and 32. To enable the blade-carrier 24 to be retracted from its limiting position as shown in FIG. 3, the housing portions 12, 14 are formed with slots 44 and the carrier 24 is formed with an opening 46 so that the user can effect retraction of the blade-carrier by inserting the finger through the holes 44 and 46 and pulling the carrier in the appropriate direction. During this action, the extent to which the blades 40 encroach upon the apertures 16, 18 and 20 is reduced to facilitate insertion of the cable.

Adjacent each of the apertures 16, 18 and 20, the housing portion 14 is formed with apertures 48 forming sockets for reception of spigot portions of L-shaped stop elements 50 which can be arranged to overlie respective ones of the apertures 16, 18 and 20 to limit the extent to which the cable can be inserted through the housing and hence the length of sheath etc. that can be stripped. The stop elements will be made in a range of sizes so that the user can select the appropriate size for the length of sheath etc. to be stripped.

In operation, the blades 40 are set by means of adjustment of the rods 28, 30 and 32 so as to produce an incision of predetermined depth for given cable size. As shown in FIGS. 1 and 3, the blade 40 associated with aperture 20 is intended to produce an incision of predetermined depth into the outer sheathing of a co-axial cable, the blade 40 associated with aperture 18 is set to make an incision into the mesh-like conductor of the cable and the blade 40 associated with the aperture 16 is set to make an incision of predetermined depth into the sleeve surrounding the inner conductor of the cable. In practice, the carrier 24 is retracted to enable the cable to be inserted into aperture 20, the cable is inserted until it comes into abutment with the corresponding stop element, the carrier is released so that the blade associated with aperture 20 makes the required incision and the incision can then be extended around the complete periphery of the cable by rotating the tool about the cable while the cable end is maintained in abutment with the corresponding stop element 50. The outer sheathing is then removed by pulling the tool axially of the cable and after removal of the outer sheathing, the same procedure can be carried out for the remaining elements of the cable which are to be stripped, the subsequent operations being carried out using the apertures 18 and 16 respectively.

When a co-axial cable of different size is to be stripped, the settings of the blades are adjusted accordingly by releasing the lock nuts 38 and rotating the portions 34. It will be noted that the tapering configuration of the apertures 16, 18 and 20 caters for the differing diameters of the respective elements of a given size of co-axial cable.

Although the invention has been described above in relation to the stripping of co-axial cables, it will be appreciated that the tool can be used for other types of cable. For example, the tool will be particularly useful in instances where electrical assembly work involves stripping of a limited range of for example single conductor cables, each blade being set for the cutting of a different sized cable of the range. 9n

I claim:

1. A manually operable tool for stripping cables, comprising a body having a plurality of cable apertures, a blade carrier in the body which is movable toward and away from the cable apertures, means resiliently urging the blade carrier toward the cable apertures, a stop which limits movement of the carrier toward the cable apertures, a plurality of blade holders adjustably mounted in the carrier, each of which is individually adjustable toward and away from one of the cable apertures, and each of which holds a blade extending transverse to said aperture, whereby each blade holder may be individually set in a position to cause its blade to produce a predetermined depth of cut in the sheath of a cable extending through the corresponding aperture when the carrier is against said stop, a finger aperture in the blade carrier, and a finger access aperture in said body, overlapping said finger aperture, which is large enough to permit the carrier to be manually drawn away from said stop for insertion of a cable into a cable aperture.

2. A manually operable tool as claimed in claim 1 wherein each blade holder comprises a screw having its shank threaded into the blade carrier and having its head rotatably coupled to a blade.

3. A manually operable tool as claimed in claim 1 wherein each cable aperture is pyriform, with the larger side of the aperture facing the blade carrier.

4. A manually operable tool as claimed in claim 1, 2 or 3 wherein a stop element extends in front of a cable aperture to receive the end of a cable.

* * * * *